(12) United States Patent
Dewey

(10) Patent No.: US 7,768,863 B1
(45) Date of Patent: Aug. 3, 2010

(54) PACKAGE-BASED VOLTAGE CONTROL

(75) Inventor: Thomas E. Dewey, Menlo Park, CA (US)

(73) Assignee: NVIDIA Corporation, Santa Clara, CA (US)

(*) Notice: Subject to any disclaimer, the term of this patent is extended or adjusted under 35 U.S.C. 154(b) by 632 days.

(21) Appl. No.: 11/619,166

(22) Filed: Jan. 2, 2007

Related U.S. Application Data

(62) Division of application No. 10/442,529, filed on May 20, 2003, now Pat. No. 7,166,934.

(51) Int. Cl.
*G11C 11/34* (2006.01)

(52) U.S. Cl. .......................... 365/226; 307/86

(58) Field of Classification Search ................. 365/226; 307/86
See application file for complete search history.

(56) References Cited

U.S. PATENT DOCUMENTS

| | | | |
|---|---|---|---|
| 3,267,406 A | 8/1966 | Davis | |
| 3,947,747 A | 3/1976 | Smith | |
| 4,638,178 A | 1/1987 | Kayser | |
| 5,589,719 A * | 12/1996 | Fiset | ............................ 307/131 |
| 5,596,532 A | 1/1997 | Cernea et al. | |
| 6,400,043 B1 | 6/2002 | Batson et al. | |
| 6,429,706 B1 | 8/2002 | Amin et al. | |
| 6,452,600 B1 | 9/2002 | Parikh et al. | |
| 6,617,916 B1 | 9/2003 | Kurotsu | |
| 6,928,022 B2 * | 8/2005 | Cho et al. | ................. 365/225.7 |
| 2004/0012082 A1 * | 1/2004 | Dewey et al. | ................. 257/686 |

* cited by examiner

*Primary Examiner*—Michael T Tran
(74) *Attorney, Agent, or Firm*—Patterson & Sheridan LLP

(57) ABSTRACT

A device package that receives a voltage from a power supply on a motherboard and that includes provisions for a voltage control element that controls the power supply voltage. The provisions for the voltage control element are such that the voltage from the power supply has a first voltage if the voltage control element is installed and a second voltage if the voltage control element is missing. Such a device is useful in (computer) systems having wiring boards with power supplies that produce output voltages that depend on adjust voltages on adjust inputs. The provisions of the device package can then set the adjust voltage such that the power supply has a first voltage if the voltage control element is installed and a second voltage if the voltage control element is missing.

15 Claims, 6 Drawing Sheets

PACKAGE-BASED VOLTAGE CONTROL

CROSS-REFERENCE TO RELATED APPLICATIONS

This application is a divisional application of U.S. patent application Ser. No. 10/442,529, filed May 20, 2003 now U.S. Pat. No. 7,166,934, which is incorporated herein by reference.

BACKGROUND OF THE INVENTION

1. Field of the Invention

The present invention relates to system integration. More particularly, this invention relates to using a device package to control the voltage from a power supply.

2. Description of the Related Art

Digital computers are used to perform a wide variety of tasks in business, industry, government, education, entertainment, and the home. Modern computers often incorporate powerful integrated circuits to implement complex functions such as 3-D graphics, voice recognition, and the like.

Because of the wide range of computer uses and applications, together with the cost constraints imposed by different users, computer manufacturers have had to produce computers with different capabilities to satisfy different market segments. This has often required different configurations of computer microprocessors, dedicated digital processors, memory, motherboards, input/output functions, display devices and power supplies. For example, while desktop computers can benefit by using higher power consumption to improve performance, in portable computers low power consumption may be more important than high performance. One method of reducing power consumption is to reduce the power supply voltage. In particular, the power consumption of random access memory (RAM) can be significantly reduced by using a lower power supply voltage.

Because of competitive pressure, even as computer systems become more powerful their manufacturers are pressured to control costs. One method of controlling costs is to reduce the number of different types of devices that must be purchased and inventoried. For example, a significant cost when manufacturing a computer system is the motherboard, which usually carries the system's power supply and RAM. Since some RAM will not operate properly on a reduced voltage, and since processors require specific operating voltages, a manufacturer has had to configure the power supply voltage to match the RAM and the processor, possibly requiring multiple voltage supplies. Having to configure the power supplies to match the RAM and the processor causes logistical problems for computer manufacturers.

While RAM typically has been located on a motherboard, a new semiconductor package, the mobile application package (MAP) from NVIDIA, the assignee of the present invention, packages both RAM and a Graphics Processor Unit (GPU) together. Because of the different cost, speed, and performance options available with RAMs and GPUs, such packaging enables different processor-RAM combinations to be offered to higher-level system manufacturers. This enables those manufacturers to offer systems with different cost, speed, and performance options while using the same motherboard, but without the logistical problems of configuring that motherboard for different RAM types. Additionally, MAP-packaged processor-RAM combinations benefit the MAP manufacturer by allowing for competitive pricing and backup suppliers.

While packaging processors and RAM together is highly beneficial, manufacturers nonetheless still had to match their power supplies to the processor and RAM. Tracking the various configurations remained difficult. For example, a low power MAP-packaged processor-RAM combination might be able to operate on low voltage (say 2.7V); while another MAP-packaged processor-RAM combination might be operable at both 3.3 and 5 volts. Furthermore, to optimize performance, another MAP-packaged processor-RAM combination might operate with the RAM at 3.3V while the GPU might operate best at 5V. Complicating the problem is that the MAP-packaged processor-RAM combination supplier might want to be free to use various GPU-RAM combinations based on cost or supply considerations without notifying the computer manufacturer what power supplies are required.

Therefore, a method of controlling a power supply or power supplies using a device package having both memory and a processor would be beneficial.

SUMMARY OF THE INVENTION

The principles of the present invention provide for device package-based control of off-device package power supplies. Beneficially, the device-package manufacturer implements such control based on the requirements of the packaged devices. Such device package-based control is suitable for automatically controlling one or more power supplies using a standardized printed circuit board interface. Preferably, the device package-based control is implemented such that the power supply voltage(s) applied to a processor, such as a GPU, and to memory, such as RAM, are optimized for the particular GPU, RAM, and/or application.

A device package that is in accord with the principles of the present invention includes an input for receiving a voltage from a power supply. Furthermore, that device package includes provisions for a voltage control element for controlling the power supply voltage. The provisions for the voltage control element are such that the power supply voltage has a first voltage if the voltage control element is installed and a second voltage if the voltage control element is missing.

A computer system that is in accord with the principles of the present invention includes a wiring board having a power supply that produces an output voltage that depends on an adjust voltage on an adjust input. A device package, which receives the output voltage, has provisions for a voltage control element for setting the adjust voltage. The provisions for the voltage control element are such that the power supply voltage has a first voltage if the voltage control element is installed and a second voltage if the voltage control element is missing.

A method of assembling a system that is in accord with the principles of the present invention includes coupling both a memory device and a voltage control resistor to a MAP substrate. The voltage control resistor (which may be a zero-ohm resistor) signals the required operating voltage of the memory device. The MAP substrate is coupled to a circuit board such that the power supply has an output that depends on the voltage control resistor.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Reference will now be made in detail to the embodiments of the present invention, examples of which are illustrated in the accompanying drawings. While the invention will be described in conjunction with those embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

The principles of the present invention provide for device packages having a standardized interface and provisions for controlling the output voltage of a power supply that is located on a mother board, such as a printed circuit board. Various embodiments of the present invention provide for switch control of a power supply, resistive control of a power supply, and both resistive and switched control of a power supply.

Figure 1A:
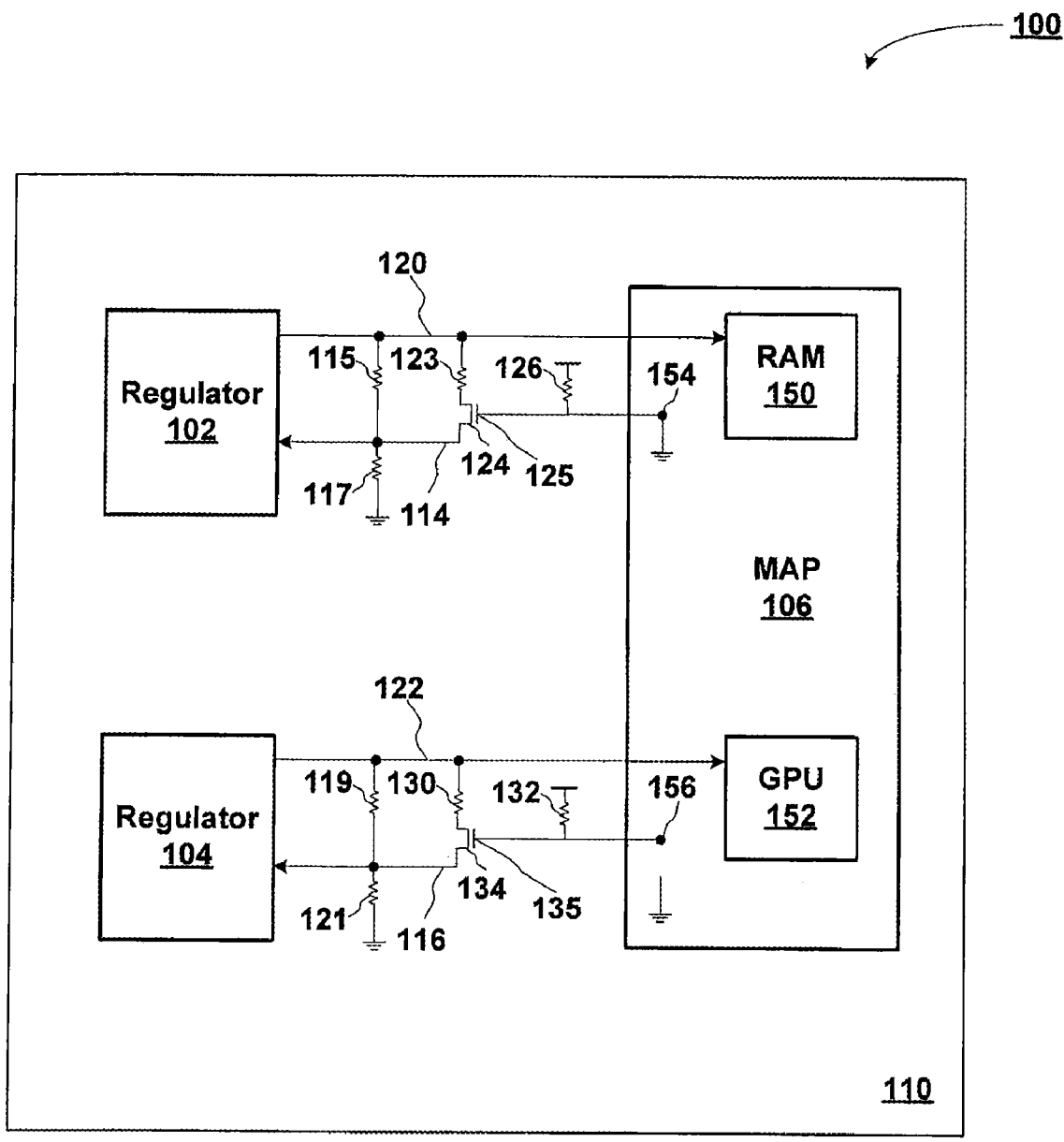
FIGS. 1A and 1B show computer systems that are in accord with embodiments of the present invention.
Figure 1B:
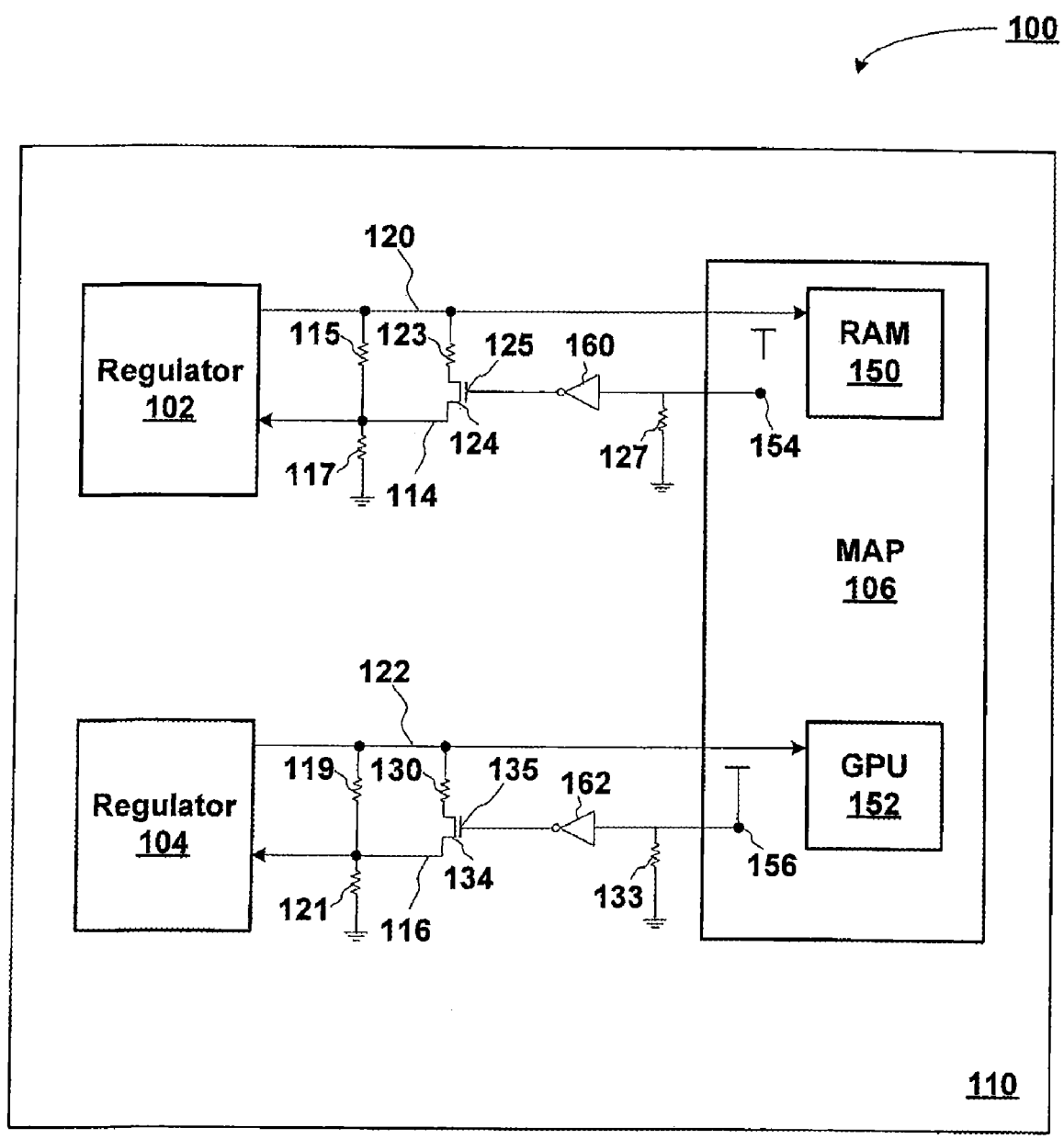

FIGS. 1A and 1B each illustrate a system 100 having power supplies that are controlled by provisions of a device package. The system 100 includes a first power supply regulator 102, a second power supply regulator 104, and a MAP (Mobile AGP Package) 106, all of which are located on a motherboard 110. The voltage outputs of the voltage regulators 102 and 104 are respectively adjusted by varying the voltages on adjust lines 114 and 116. The adjust voltage on line 114 is determined by a first voltage divider that divides the output voltage of regulator 102, which is available on line 120. The first voltage divider includes a resistor 115 that extends between lines 120 and 114, and a second resistor 117 that extends from the adjust line 114 to ground. The voltage on adjust line 116 is determined by a second voltage divider that divides the output voltage of regulator 104, which is available on line 122. The second voltage divider includes a resistor 119 that extends between lines 122 and 116, and a second resistor 121 that extends from adjust line 116 to ground. The first and second voltage dividers include additional elements that are subsequently described.

Referring to FIG. 1A, the voltage on adjust line 114 sets the voltage from the regulator 102. By increasing the voltage on adjust line 114 the voltage on line 120 can be decreased. To that end, the first voltage divider includes a resistor 123 that can be selectively switched between lines 114 and 120 by a transistor 124. The gate 125 of transistor 124 is pulled high by a resistor 126. As long as the gate remains high, the transistor 124 is ON, and the resistor 123 is switched into operation to decrease the output voltage by reducing the voltage drop between lines 120 and 114. Resistor 130, resistor 132, and transistor 134 impact the second voltage divider in the same manner as resistors 123 and 126, and transistor 124 impact on the first voltage divider.

Still referring to FIG. 1A, the output voltage of regulator 102 is applied to RAM 150 within the MAP 106, while the output voltage of regulator 104 is applied to a GPU 152 within the MAP 106. Furthermore, the gate of transistor 124 is connected to a switch 154 within the MAP 106, while the gate of transistor 134 is connected to a switch 156 within the MAP 106. The switches 154 and 156 are features that provide for setting the output voltages of the regulators, as is described below.

As shown in FIG. 1A, switch 154 is closed, thus connecting the gate 125 of transistor 124 to ground. This causes the transistor 124 to turn OFF, thus disconnecting the resistor 123 from line 114. This reduces the voltage on line 114, which, in turn, increases the voltage on line 120 to the RAM 150. However, the switch 156 is open, thus enabling the gate 135 of transistor 134 to remain HIGH. This causes transistor 134 to turn ON, connecting resistor 130 to adjust line 116. This increases the voltage on line 116, which, in turn, decreases the voltage on line 122 to the GPU 152. Therefore, the states of the switches 154 and 156 control the voltages to the RAM and GPU, respectively.

Referring to FIG. 1B, the voltage on adjust line 114 sets the voltage from the regulator 102. The input of an inverter 160 is pulled high by resistor 127. The output of inverter 160 and gate 125 of transistor 124 is pulled low, causing transistor 124 to turn OFF, thus disconnecting the resistor 130 from line 116. This reduces the voltage on line 116, increasing the voltage drop between lines 122 and 116. Resistor 130, resistor 133, inverter 162, and transistor 134 impact the second voltage divider in the same manner as resistors 123 and 127, inverter 160, and transistor 124 impact on the first voltage divider.

Still referring to FIG. 1B, the output voltage of regulator 102 is applied to RAM 150 within the MAP 106, while the output voltage of regulator 104 is applied to a GPU 152 within the MAP 106. Furthermore, the input of inverter 160 is connected to a switch 154 within the MAP 106, while the input of inverter 162 is connected to a switch 156 within the MAP 106. The switches 154 and 156 are features that provide for setting the output voltages of the regulators, as is described below.

As shown in FIG. 1B, switch 156 is open, thus enabling resister 133 to pull the input of inverter 162 high. The output of inverter 162 is pulled low, causing the transistor 134 to turn OFF, thus disconnecting the resistor 130 from line 116. This reduces the voltage on line 116, which, in turn, increases the voltage on line 122 to the GPU 152. However, the switch 154 is closed, thus enabling resister 127 to pull the input of inverter 160 low, enabling the gate 125 of transistor 124 to remain HIGH. This causes transistor 124 to turn ON, connecting resistor 123 to adjust line 114. This increases the voltage on line 114, which, in turn, decreases the voltage on line 120 to the RAM 150. Therefore, the states of the switches 154 and 156 control the voltages to the RAM and GPU, respectively.

By incorporating the principles of the present invention, a system manufacturer can allow the MAP supplier to control the voltage applied to the RAM 150 and to the GPU 152. Therefore, the MAP supplier is free to control whether or not a device within the MAP should operate at a reduced or at an elevated voltage. Furthermore, the power supply voltage control is "selected" by the inclusion or exclusion of a resistive element, such as a zero ohm resistor, a solder ball, a fuse-able interconnect, or a jumper wire. The fuse-able interconnect can be opened, e.g., blown, by using a laser or inducing a large current through the interconnect, optionally prior to populating a MAP with a GPU or memory devices. While FIG. 1A shows the switches 154 and 156 as being referred to ground, this is not required. The switches could also be switched to the output of a power supply, provided, of course, that the resistors 126 and 132, and the transistors 124 and 134, are configured to work with the output of the power supply.

Furthermore, in some embodiments power supply regulator 102 and power supply regulator 104 may be replaced with a voltage regulator module configured to receive a multi-bit voltage identification, and produce several output voltages. A multi-bit voltage identification may be produced by lines 114 and 116.

While FIGS. 1A and 1B illustrate power supply control by selectively switching resistors 123 and 130 into parallel with resistors 115 and 119, respectively, in some applications this may not be optimal. To reduce part count and burdens on the computer system manufacturer, it some applications it may be better to place voltage control resistors inside the MAP itself. For example FIG. 2 illustrates two different techniques of controlling power supplies by placing "voltage adjust" resistors within the MAP device.

Figure 2:
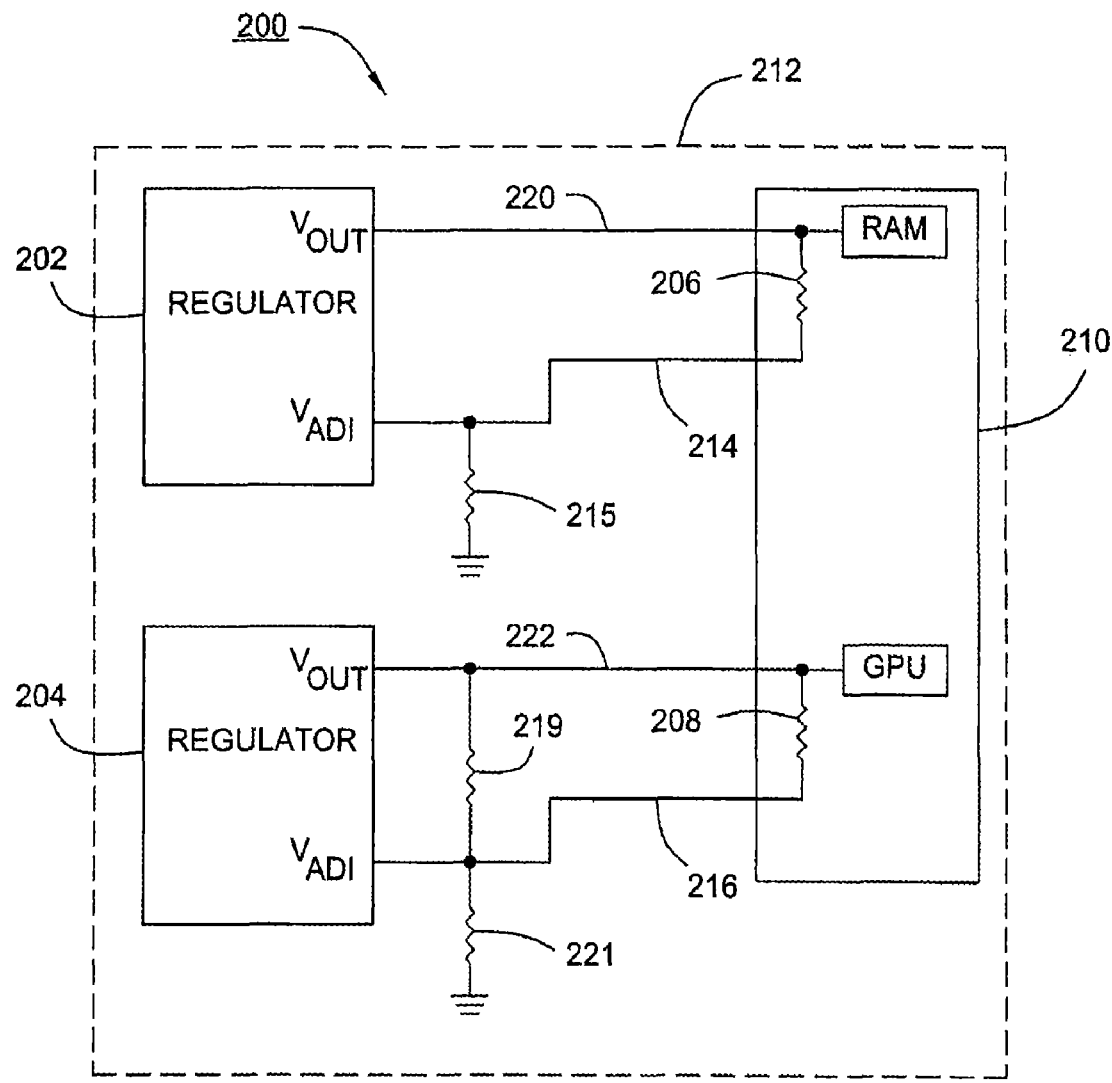
FIG. 2 shows a computer system that is in accord with another embodiment of the present invention.

Refer now to FIG. 2 for a depiction of a system 200 that controls a first power supply regulator 202 and a second power supply regulator 204 using resistors 206 and 208 inside a MAP 210, all of which are located on a motherboard 212. The voltage regulators 202 and 204 are respectively controlled by varying the voltages on adjust lines 214 and 216. The voltage on adjust line 214 is determined by a first voltage divider that divides the output voltage of regulator 202 on line 220. The first voltage divider is comprised of the resistor 206 that extends between lines 220 and 214, and a second resistor 215 that extends from line 214 to ground. The voltage on adjust line 216 is determined by a second voltage divider that divides the output voltage of regulator 204 on line 222. The second voltage divider includes a resistor 219 that extends between lines 222 and 216, the resistor 208, which is parallel with resistor 219, and a resistor 221 that extends from adjust line 216 to ground.

Still referring to FIG. 2, the voltage on adjust line 214 depends on the resistance values of resistors 206 and 215. Assuming the manufacturer of the MAP specifies the value of resistor 215, that manufacturer can then control the voltage on line 220 by installing a resistor 206 having the correct value. Similarly, assuming the manufacturer of the MAP specifies the value of resistors 219 and 221, that manufacturer can control the voltage on adjust line 216 by installing a resistor 208 having the correct value. Furthermore, by leaving the resistor 208 out of the package, a default voltage from the voltage regulator 204 can be selected.

Figure 3:
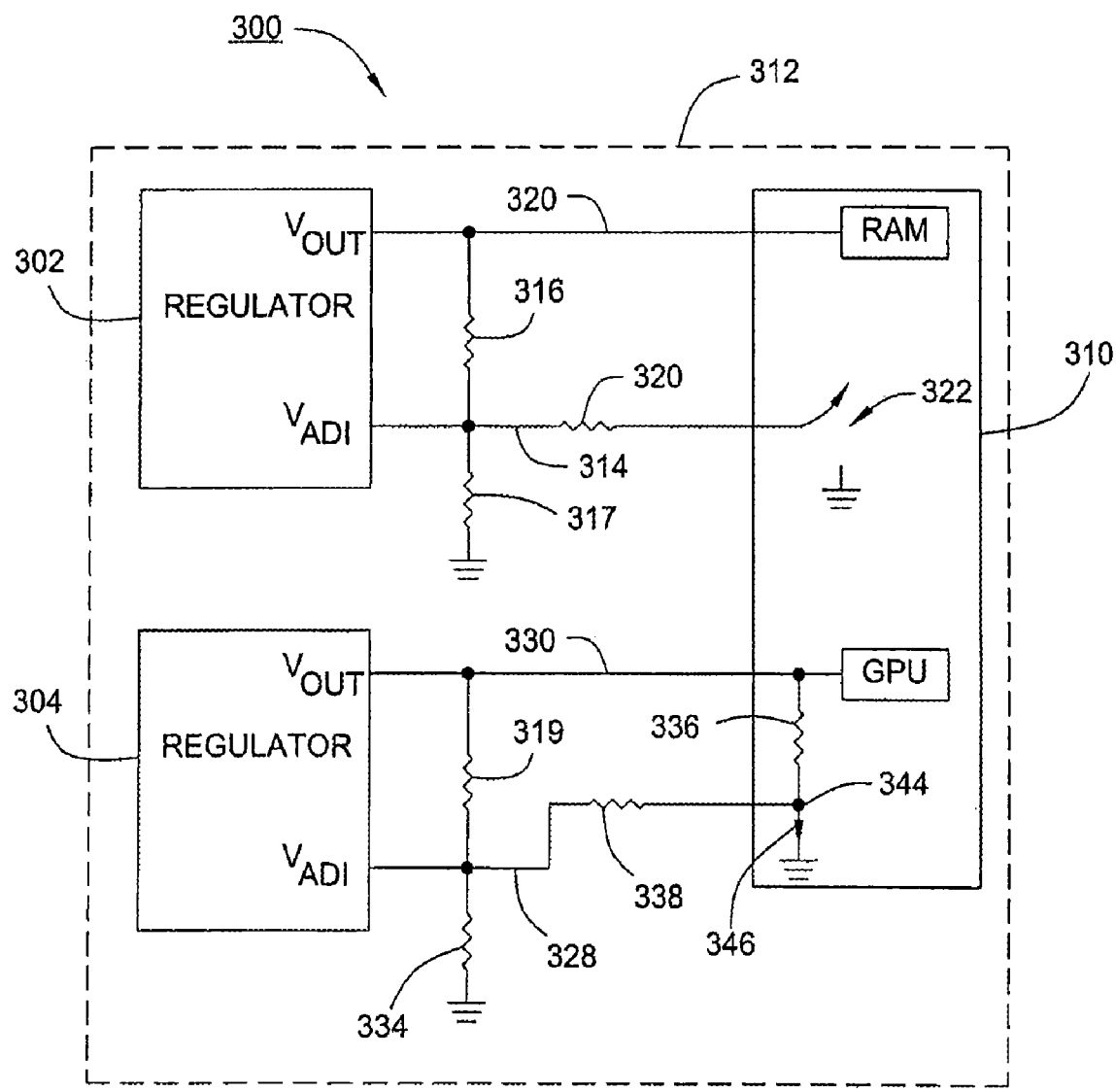
FIG. 3 shows a computer system that is in accord with yet another embodiment of the present invention.

While placing the voltage adjust resistors within the MAP is beneficial in reducing overall part count, in fact there is little room within available MAPs for the resistors. Furthermore, placing the resistors in the MAP can result in increased electrical noise. FIG. 3 illustrates techniques of addressing some of the problems by combining features from FIGS. 1 and 2.

Refer now to FIG. 3 for a depiction of a system 300 that controls a first power supply regulator 302 and a second power supply regulator 304 using features of a MAP 310, all of which are located on a motherboard 312. The voltage regulators 302 and 304 are respectively adjusted by varying the voltages on adjust lines 314 and 328. The voltage on adjust line 314 is determined by a first voltage divider that divides the output voltage of regulator 302 on line 320. The first voltage divider is comprised of a resistor 316 that extends between lines 320 and 314, a second resistor 317 that extends from adjust line 314 to ground, and by a resistor 320 that is selectively switched to be in parallel with resistor 317. Selective switching is performed by a switch 322 within the MAP 310. If the manufacturer of the MAP 310 installs a zero-ohm resistor across switch 322 the voltage on line 314 will drop, thus adjusting the voltage on line 320. However, if switch 322 is open, the output of the regulator 302 depends only on resistors 316 and 317.

Still referring to FIG. 3, the voltage on adjust line 328 is determined by a second voltage divider that divides the output voltage of regulator 304 on line 330. The second voltage divider includes a resistor 319 that extends between lines 330 and 328, a resistor 334 that extends from adjust line 328 to ground, and a series connection of a resistor 336 of a resistor 338 that run parallel to resistor 319.

Still referring to FIG. 3, the junction 344 of resistors 336 and 338 is electrically available inside the MAP 310. It should be noted that while resistor 336 is illustrated as being inside the MAP 310, this is not required. Placing resistor 336 within the MAP 310 enables the manufacturer of the MAP 310 to control the voltage on line 330, but at the expense of increased noise and manufacturing difficulty. In any event, the junction 344 is electrically connected to a switch 346. By selectively closing the switch 346 the voltage at adjust line 328 can be changed. The selective switching is beneficially performed by having the manufacturer of the MAP 310 selectively install a zero-ohm resistor across switch 346. If the switch 346 is closed, the voltage on line 328 will drop since resistors 334 and 338 are not in parallel. But, if the switch is open, the voltage will rise since the series combination of resistors 336 and 338 are now parallel with resistor 319.

Figure 4:
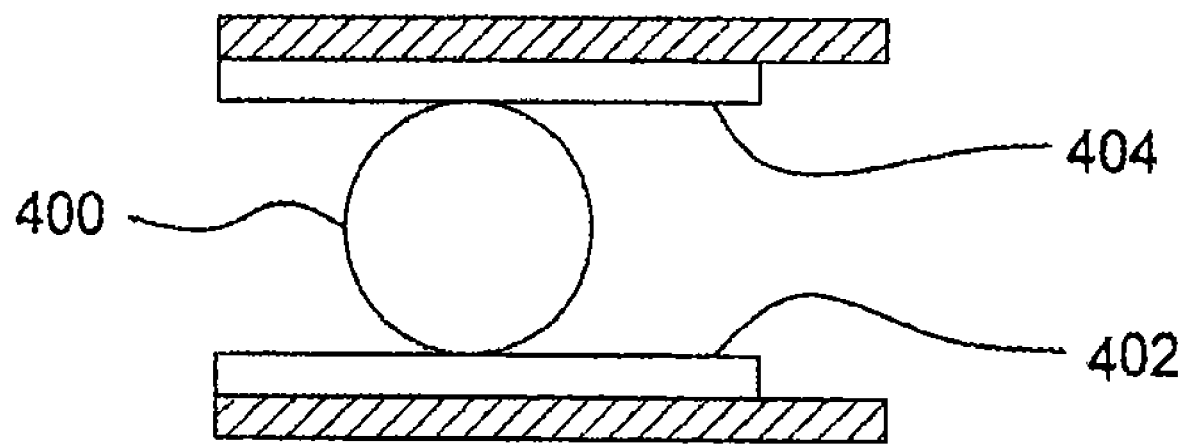
FIG. 4 illustrates using conductive balls as switch (resistor) elements.

It should be noted that MAPs have compact and inexpensive attachment footprints that can use ball grid arrays to make contacts with contact pads on the motherboard. Ball grid arrays are more flexible than prior art slot connections or socket connections since they enable customizable attachment footprints. By selectively installing or leaving out particular zero-resistance balls in the ball grid, switches can be selectively opened or closed. For example, FIG. 4 illustrates conductive ball 400 that runs between a ground line 402 and an electrical contact 404, say of switch 346 in FIG. 3. The ground line 402 might be a pad on a motherboard, say the motherboard 312 of FIG. 3. Additionally, if desired, nonconductive balls can be added to the ball grid to ensure mechanical and electrical performance. This flexibility enables easily customizable features that can support different versions of the industry standard AGP (accelerated graphics port) interface.

Figure 5:
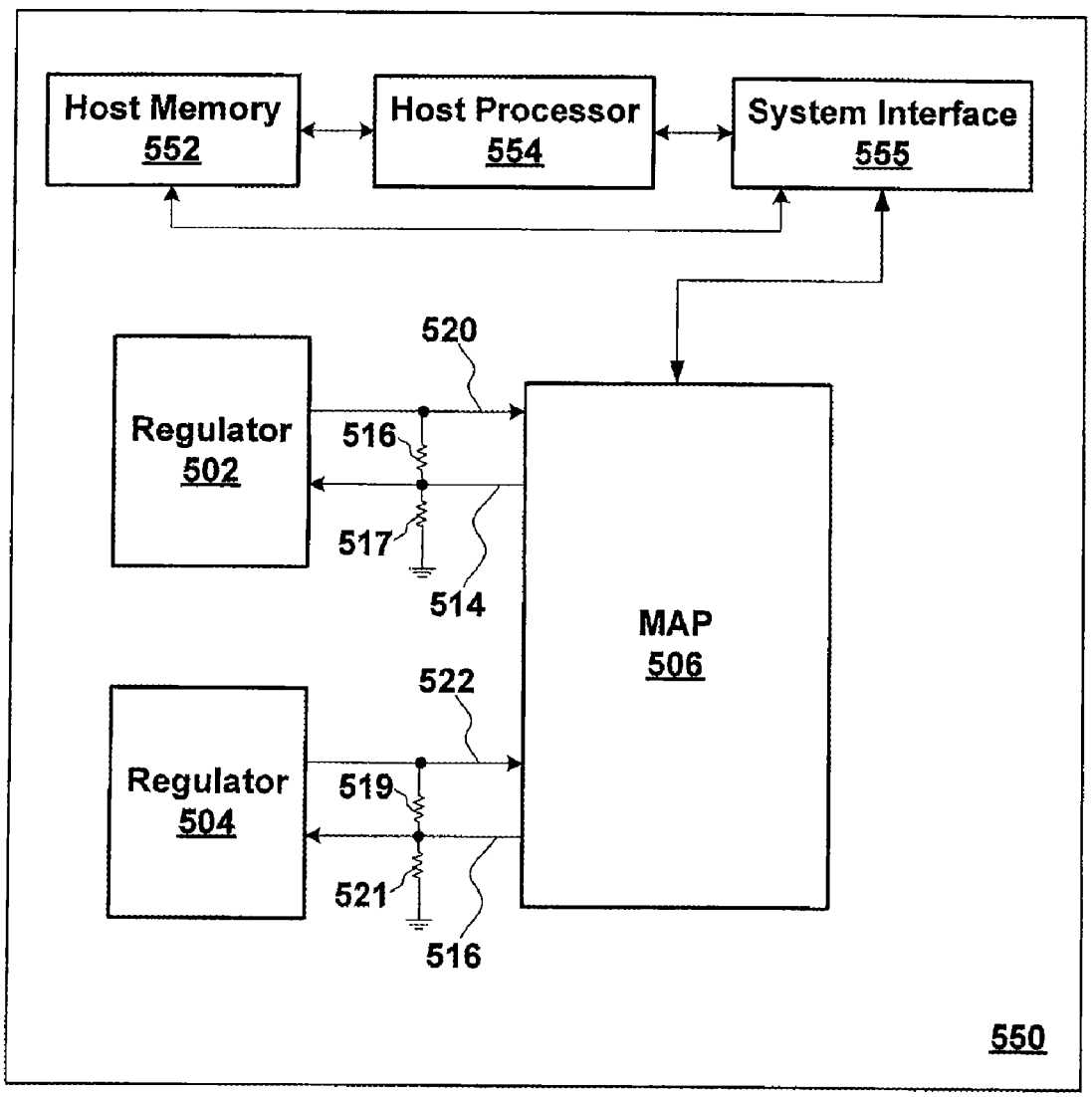
FIG. 5 shows a computing system that is in accord with the principles of the present invention.

FIG. 5 is an illustration of a computing system generally designated 550 and including a host processor 554, a host memory 552, a system interface 555, a MAP 506, and resistors 516, 517, 519, and 521. Computing system 550 may be a desktop computer, server, laptop computer, palm-sized computer, tablet computer, game console, cellular telephone, computer based simulator, or the like. In one embodiment of computing system 550 host memory 552, host processor 554, system interface 555, MAP 506, and resistors 516, 517, 519, and 521 are coupled to a printed wiring board.

Host processor 554 may include a system memory controller to interface directly to host memory 552 or may communicate with host memory 552 through a system interface 555. System interface 555 may be an I/O (input/output) interface or a bridge device including the system memory controller to interface directly to host memory 552. Examples of system interface 555 known in the art include Intel® Northbridge and Intel® Southbridge. Host processor 554 communicates with MAP 506 via system interface 555.

Computing system 550 controls a first power supply regulator 502 and a second power supply regulator 504 using resistors and optional resistors inside MAP 506, such as shown in MAP 210, MAP 106, and MAP 310. The voltage regulators 502 and 504 are respectively controlled by varying the voltages on adjust lines 514 and 516. The voltage on adjust line 514 is determined by a first voltage divider that divides the output voltage of regulator 502 on line 520 and one or more resistors within MAP 506 as shown in MAP 106 in FIG. 1, MAP 210 in FIG. 2, or MAP 310 in FIG. 3. The first voltage divider is comprised of the resistor 516 that extends between lines 520 and 514, and a second resistor 517 that extends from line 514 to ground. The voltage on adjust line 516 is determined by a second voltage divider that divides the output voltage of regulator 504 on line 522 and one or more resistors within MAP 506 as shown in MAP 106 in FIG. 1, MAP 210 in FIG. 2, or MAP 310 in FIG. 3. The second voltage divider is comprised of the resistor 519 that extends between lines 522 and 516, and a second resistor 521 that extends from line 516 to ground.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A method of assembling a system comprising the steps of:
   coupling a memory device to a mobile application package (MAP) substrate;
   coupling the MAP substrate to a power supply through a first voltage control element that provides a first non-zero voltage to the memory device when operating in a first configuration and a second non-zero voltage to the memory device when operating in a second configuration.

2. The method of claim 1 further comprising coupling the MAP substrate to a circuit board such that the first voltage control element coupled to the MAP substrate is operatively connected to the circuit board.

3. The method of claim 1 wherein the first voltage control element is a first resistance element.

4. The method of claim 3 wherein the first resistance element is a low resistance element.

5. The method of claim 3 wherein the first resistance element is a voltage adjust resistor.

6. The method of claim 3 wherein the first resistance element is a conductive ball.

7. The method of claim 3 wherein the first resistance element is a fuse-able interconnect.

8. The method of claim 1, further comprising the steps of:
   coupling a graphics processor to the MAP substrate; and
   coupling the MAP substrate to the power supply through a second voltage control element that provides a third non-zero voltage to the graphics processor when operating in a third configuration and a fourth non-zero voltage to the graphics processor when operating in a fourth configuration.

9. The method of claim 8 wherein the second voltage control element is a second resistance element.

10. The method of claim 9 wherein the second resistance element is a ball.

11. The method of claim 9 wherein the second resistance element is a fuse-able interconnect.

12. The method of claim 1, wherein the first voltage control element is included within the MAP.

13. The method of claim 8, wherein the second voltage control element is included within the MAP.

14. The method of claim 8, wherein the first voltage control element operates in either the first configuration or the second configuration in conjunction with the second voltage control element operating in either the third configuration or the fourth configuration.

15. The method of claim 9, wherein the second resistance element is a voltage adjust resistor.

* * * * *